(12) United States Patent
Ma et al.

(10) Patent No.: US 6,194,604 B1
(45) Date of Patent: Feb. 27, 2001

(54) PROCESS FOR PRODUCING PHOSPHOROUS ACID

(75) Inventors: Yinong Ma, Westfield, MA (US); Jerald D. Heise, St. Louis, MO (US)

(73) Assignee: Monsanto Company, St. Louis, MO (US)

( * ) Notice: Subject to any disclaimer, the term of this patent is extended or adjusted under 35 U.S.C. 154(b) by 0 days.

(21) Appl. No.: 09/274,629

(22) Filed: Mar. 23, 1999

Related U.S. Application Data
(60) Provisional application No. 60/111,734, filed on Dec. 10, 1998.

(51) Int. Cl.$^7$ ........................................................ C07F 9/38
(52) U.S. Cl. ................................................ 562/17; 562/8
(58) Field of Search ..................................... 562/11, 17, 8

(56) References Cited

U.S. PATENT DOCUMENTS

| | | | |
|---|---|---|---|
| 2,661,364 | 12/1953 | Ernsberger et al. | 260/461 |
| 3,470,270 | 9/1969 | Wardi | 260/502.5 |
| 3,528,772 | 9/1970 | Whyte et al. | 23/165 |
| 3,644,595 | 2/1972 | Wu | 260/920 |
| 3,927,080 | 12/1975 | Gaertner | 260/926 |
| 3,956,370 | 5/1976 | Parry et al. | 260/502.5 |
| 3,969,398 | 7/1976 | Hershman | 260/502.5 |
| 4,171,719 | 10/1979 | Wünnenberg et al. | 164/150 |
| 4,624,937 | 11/1986 | Chou | 502/180 |
| 4,654,429 | 3/1987 | Balthazor et al. | 558/145 |
| 4,696,772 | 9/1987 | Chou | 260/502.5 |
| 5,741,942 | 4/1998 | Bryant et al. | 568/454 |

FOREIGN PATENT DOCUMENTS

| | | | |
|---|---|---|---|
| 0 055 695 | 7/1982 | (EP) | C07F/9/38 |
| 1112976 | 5/1968 | (GB) | C97F/9/06 |
| WO98/35930 | 2/1998 | (WO) | C07C/62/00 |
| WO 99/19252 | 4/1999 | (WO) . | |

OTHER PUBLICATIONS

Annex to The European Search Report for EP 99 30 9903 dated Feb. 23, 2000.
CA:119:28602 abs of SU902429, Dec. 1992.*
CA:101:55333 abs of DE3232753, Mar. 1984.*
CA:73:24832 abs of Zh. Obshch. Khim Feshchenko, 40 (4) pp. 770–773, 1970.*

Doorfman, et al., "Kinetics and Mechanism of the Oxidative Alkoxylation of Tetraphosphorous in the Presence of Copper (II) Sulfates and Carboxylates," Kinetics and Catalysis, vol. 56, No. 1, pp. 93–100 (1995).

Okamoto, et al., "Preparation of diethyl phosphite by oxidation of white phosphoruous in ethyl alcohol," Osaka U., Suita, Japan. Yukagaku (1970), 19(10).

Okamoto, "Synthesis of aliphatic organophosphorous comppounds," Inst. Sci. Ind. Res., Osaka Univ. Japan. Yukagaku (1974), 23 (1), 2–8.

Brown, et al., "The Synthesis of Organophosphorous Compounds Directly From the Element", Phosphorous and Sulfur, vol. 5, pp. 67–80 (1978).

Dorfman, et al., "Oxidation of Tetraphosphorus by Oxygen in Alcohols in the Presence of Iodine and Sodium Nitrite," Kinetics and Catalysis, vol. 37, No. 2, 1996, pp. 183–192.

Engelk, M.R., Comptes Rendus Academy of Science, pp. 786–787, Jan.–Jun. 1890 (with English translation).

* cited by examiner

Primary Examiner—Jean F. Vollano
(74) Attorney, Agent, or Firm—Senniger, Powers, Leavitt & Roedel

(57) ABSTRACT

A process for the manufacture of phosphorous acid by selective hydrolysis of phosphite esters. A hydrolysis feed mixture comprising phosphite esters and phosphate esters is contacted with liquid water or steam to selectively hydrolyze the phosphite esters to phosphorous acid. The feed mixture may be prepared by oxidation of elemental phosphorous in the presence of an alcohol. In the oxidation and/or a subsequent esterification step, P(III) and P(V) oxyacids produced in the oxidation reaction are esterified, preferably quantitatively. The ester mixture may be washed to remove unesterified phosphoric and hypophosphorous acid, after which the selective hydrolysis is carried out.

2 Claims, 3 Drawing Sheets

PROCESS FOR PRODUCING PHOSPHOROUS ACID

This patent claims priority from U.S. Provisional Patent Application Ser. No. 60/111,734 (filed Dec. 10, 1998). The complete text of this provisional patent application is hereby incorporated herein by reference.

BACKGROUND OF THE INVENTION

This invention relates to the preparation of oxyacids of phosphorus and esters thereof, and more particularly to novel and improved processes for the preparation and recovery of oxyacids, especially phosphorous acid.

Phosphorus-containing compounds such as oxyacids of phosphorus, organophosphates and organophosphites are important precursors for the synthesis of other phosphorus species, which have various applications, for example, in herbicides, insecticides, fertilizers, flame retardants and plasticizers. The syntheses of such oxyacids of phosphorus, organophosphates and organophosphites have commonly used a halogen derivative of phosphorus, such as $PCl_3$ or $POCl_3$, as a starting material. Nevertheless, since the halogen derivatives are themselves prepared from elemental phosphorus, an economic advantage could be gained by preparing oxyacids of phosphorus, organophosphates and organophosphites directly from elemental phosphorus. Such direct preparation could also provide environmental benefits by avoiding the use of halogen-containing phosphorus starting materials and production of halogen-containing byproducts.

White phosphorus, the elemental phosphorus allotrope also referred to as yellow phosphorus or tetraphosphorus ($P_4$), is a potential starting point for the synthesis of a variety of phosphorus species. The tetrahedral structure of white phosphorus contains six phosphorus-phosphorus bonds and can provide a large number of reactive species having an intermediate existence in phosphorus reactions. The competition of these reactive species for the organic reactants, however, can give complex reaction mixtures with low yields of desired products.

Various references have disclosed processes for the aerobic oxidation of white phosphorus in the presence of alcohols, but the reported processes have not provided an economical procedure for obtaining desirable phosphorus-containing compounds with high yield and purity. For example, Ernsberger et al. (U.S. Pat. No. 2,661,364) describes a process for preparing dialkylphosphite wherein oxygen is introduced into a mixture of small cut-up pieces of white phosphorus and a monomeric, saturated alcohol exemplified by ethanol, n-butanol, n-propanol, isopropanol and n-hexanol. Ernsberger et al. indicates that the various reaction products are isolated from the reaction mixture by conventional techniques, e.g., removal of phosphorous acid by aqueous extraction and recovery of alcohol by distillation. Ernsberger et al. further state that some dialkylphosphites are too unstable to be separated by distillation and may be used without isolation from the reaction mixture.

Kellerman et al. (British Patent No. 1,112,976) describes a process for producing organophosphorus compounds by reaction of white phosphorus, oxygen and a hydrocarbon compound containing at least one phenolic hydroxy group, a hydrocarbon compound containing more than one alcoholic hydroxy group, or a hydrocarbon containing a thiol group, to produce a mixture of esters of oxyacids of phosphorus in which the overall oxidation state of phosphorus is substantially 4. The Kellerman et al. process may take place in an inert organic solvent. The product of the Kellerman et al. process is a viscous mixture of non-isolated esters of oxyacids of phosphorus.

Okamoto et al., *Yukagaku* 19(10):968–72 (1970) (translated) describes a process for preparing diethylphosphite by reacting white phosphorus, oxygen and ethanol, after which excess ethanol is removed by vacuum distillation to obtain a 43% yield of diethylphosphite. The reaction was also performed in water and carbon tetrachloride.

A need has remained in the art for improved processes for the preparation of oxyacids, and in particular for improved methods of separating mixtures that contain phosphorus oxyacids, organophosphites and/or organophosphates. There is a further need in the art for a process that directly converts phosphorus, most preferably white phosphorus, to oxyacids of phosphorus, organophosphates and/or organophosphites, wherein the various desired products are obtained in high yield and purity and with economical isolation techniques. There is also a need for such a process that is environmentally safe, preferably by using low levels of solvents and avoiding the use of halogen-containing starting materials.

SUMMARY OF THE INVENTION

Among the several objects of the present invention may be noted the provision of an improved process for the preparation of oxyacids of phosphorus; the provision of a process for separation of oxyacids from mixtures of oxyacids and esters thereof; the provision of a process for selectively converting esters of phosphorous acid to phosphorous acid; the provision of a process for separating, and/or for producing and separating, phosphorous acid from mixtures of phosphorous acid, phosphite esters, phosphoric acid, and phosphate esters; the provision of a process for isolating phosphorous acid from mixtures comprising phosphorous acid and phosphoric acid; the provision of a process in which phosphite esters and hypophosphorous acid are both converted to and recovered as phosphorous acid; and the provision of a process for separation of phosphorous acid from mixtures comprising phosphorous acid and hypophosphorous acid.

Briefly, therefore, the present invention is directed to a process for the preparation of phosphorous acid. The process comprises oxidizing a substrate selected from the group consisting of elemental phosphorus and a P(I) species to produce P(III) and P(V) oxidation products; esterifying the oxidation products by reaction with an alcohol; and selectively hydrolyzing phosphorous acid esters produced by the esterification, thereby producing a hydrolysis reaction mixture containing phosphorous acid and phosphate esters(s).

The invention is further directed to a process for the preparation of phosphorous acid comprising oxidizing a substrate selected from the group consisting of elemental phosphorus and a P(I) species in the presence of an alcohol in a condensed phase reaction medium containing not more than about 5% by weight water, to produce an oxidation reaction mixture comprising P(III) and P(V) oxidation products selected from the group consisting of alkyl esters of phosphorous acid, alkyl esters of phosphoric acid, phosphorous acid, phosphoric acid and mixtures thereof. The phosphorous acid esters produced in the oxidation reaction mixture are selectively hydrolyzed to produce a hydrolysis reaction product containing alkyl phosphates and phosphorous acid.

The invention is further directed to a process comprising oxidizing a substrate selected from the group consisting of elemental phosphorus and a P(I) species in the presence of an alcohol in a condensed phase reaction medium while removing water from the reaction medium to produce an oxidation reaction mixture comprising P(III) and P(V) oxidation products selected from the group consisting of alkyl esters of phosphorous acid, alkyl esters of phosphoric acid and mixtures thereof. The phosphorous acid esters produced in the oxidation reaction mixture are selectively hydrolyzed, thereby producing a hydrolysis reaction mixture containing alkyl phosphate esters and phosphorous acid.

The invention is further directed to a process for the preparation of phosphorous acid comprising oxidizing a substrate selected from the group consisting of phosphorus and a P(I) species in the presence of an alcohol to produce an oxidation reaction mixture comprising P(III) and P(V) oxidation products selected from the group consisting of phosphorous acid, alkyl esters of phosphorous acid, phosphoric acid, and alkyl esters of phosphoric acid. Water is removed from contact with the oxidation products to promote formation of alkyl esters of phosphorous acid and alkyl esters of phosphoric acid, inhibit hydrolysis thereof, and yield a mixture comprising said esters. Phosphorous acid esters of the ester mixture are selectively hydrolyzed to produce a hydrolysis reaction mixture containing alkyl phosphates and phosphorous acid.

The invention is also directed to a process for the preparation of phosphorous acid comprising contacting phosphorus with an alcohol to produce a condensed phase reaction system; and introducing oxygen into the reaction system to oxidize phosphorus and produce a reaction mixture comprising P(III) reaction product(s), comprising phosphorous acid in alkyl esters of phosphorous acid. The introduction of oxygen into the condensed phase system is conducted under conditions of oxygen, partial pressure, temperature, and agitation of the reaction mixture such that the rate of consumption of oxygen in the reaction is not greater than about 0.2 lbs. per hour per lb. of phosphorus initially contained in said condensed phase system.

The invention is further directed to a process for recovering phosphorous acid from a mixture of phosphorus oxyacid esters comprising contacting a hydrolysis feed mixture comprising esters of phosphorous and phosphoric acid with liquid water or steam at a temperature effective for selectively hydrolyzing phosphorous acid esters initially contained in the mixture, thereby producing a hydrolysis reaction mixture containing phosphorus oxyacids in a molar ration of at least about 8 moles phosphorous acid per mole phosphoric acid.

The invention is also directed to a process for the preparation of phosphorous acid comprising preparing a hydrolysis feed mixture comprising esters of phosphorous acid and phosphoric acid and contacting the hydrolysis feed mixture with liquid water or steam at a temperature effective for selectively hydrolyzing phosphorous acid esters initially contained in the mixture, thereby producing a hydrolysis reaction mixture containing phosphorous acid and esters of phosphoric acid. Preparation of the hydrolysis feed mixture comprises oxidation of a substrate comprising elemental phosphorus or a P(I) species in an oxidation reaction zone in the presence of an alcohol.

Other objects and features will be in part apparent and in part pointed out hereinafter.

DESCRIPTION OF THE PREFERRED EMBODIMENTS

Figure 1:
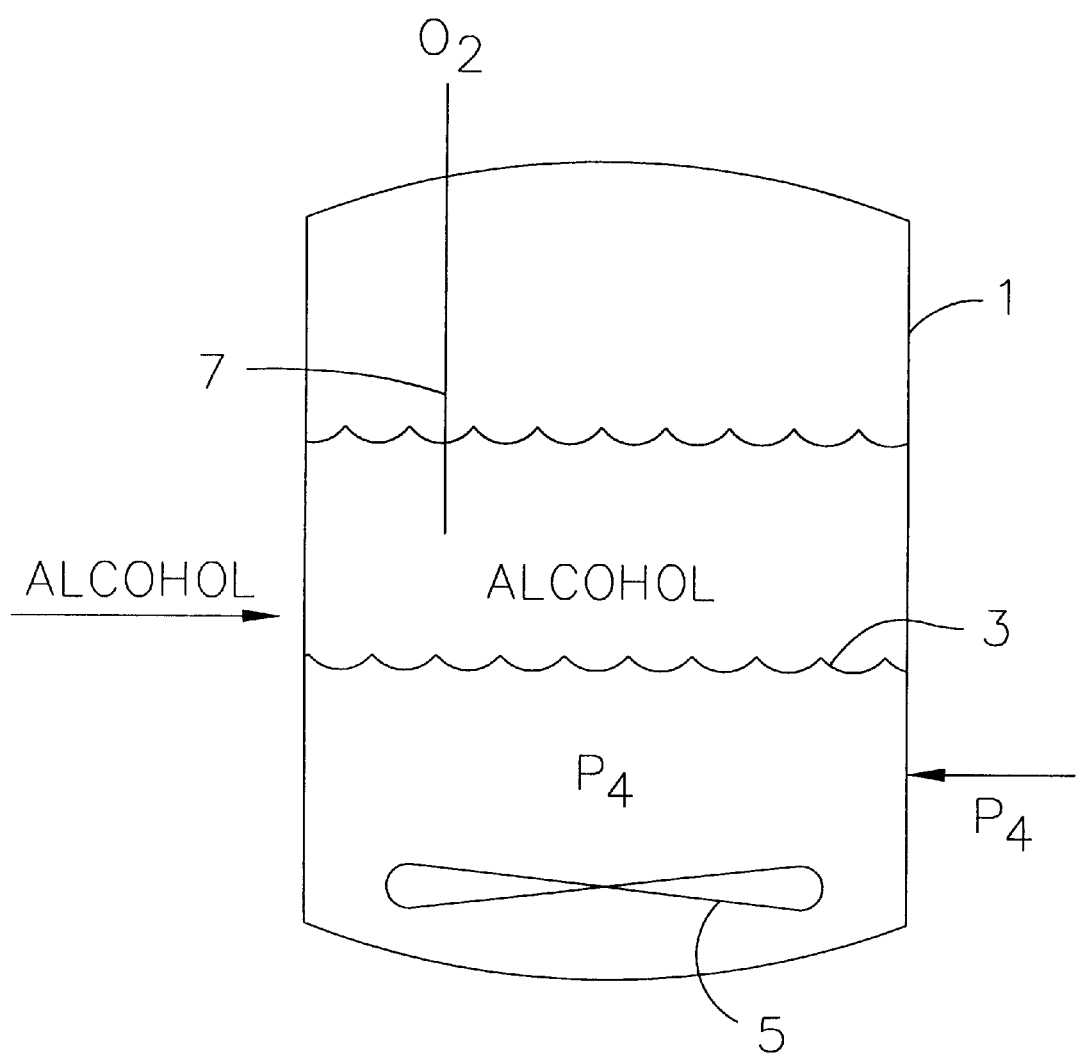
FIG. 1 is a schematic illustration of a continuous stirred tank reactor for carrying out the oxidation step of the process of the invention.

In accordance with the present invention, a process has been discovered for economically separating phosphorus compounds of different oxidation states from mixtures of phosphorus compounds including oxyacids of phosphorus, organophosphates and organophosphites. The inventive separation method isolates various desired products from such mixtures based on differences in the rate of hydrolysis of organophosphorus compounds of different oxidation states as well as the efficient partitioning of phosphorus species of different polarities in a biphasic system. More particularly, the present invention comprises a process for obtaining separate phosphorous acid, phosphate esters, and phosphoric acid products from mixtures of phosphate and phosphite esters; and further for separating hypophosphorous acid from mixtures comprising phosphate esters and/or phosphite esters.

Separation is effected by selective hydrolysis of phosphite esters in mixtures of phosphite and phosphate esters, followed by phase separation in which phosphorous acid is obtained in an aqueous phase and phosphate esters obtained in an organic phase of limited miscibility with water. The mixture of esters to be subjected to differential hydrolysis may be obtained by esterification of phosphorous and phosphoric acid in an acid mixture thereof. Preferably, the mixture of esters is provided by oxidation of elemental phosphorus or a P(I) species in the presence of an alcohol. The oxidation reaction product comprises a mixture of oxyacids of phosphorus, phosphate esters and phosphite esters which may optionally be subjected to further esterification, then separated by differential hydrolysis to economically obtain desired products in high yield and purity.

Preferably, the phosphorus substrate for the process of the invention comprises tetraphosphorus ($P_4$), most preferably the white phosphorus allotrope of tetraphosphorus. The alcohol is preferably an unsubstituted alkanol, though haloalkanols or other substituted alkanols may also be used. Generally, $C_1$ to $C_{30}$ alkanols are suitable. Further description of suitable alcohols is set forth hereinbelow.

In a preferred form, the process of the invention comprises oxidation of white phosphorus in the presence of an alcohol, e.g., by contacting white phosphorus with oxygen and an alcohol under mild conditions, and isolating desired products from the reaction mixture in the manner outlined above, which is based on the rate difference in hydrolysis of organophosphorus species in different oxidation states as well as the efficient partitioning of phosphorus species of different polarities in a biphasic system. More particularly, it has been found that phosphite esters are more readily hydrolyzed than phosphate esters, so that hydrolysis of a mixture of phosphate and phosphite esters produces a two phase mixture comprising an aqueous phase containing phosphorous acid, and an organic phase containing predominantly phosphate esters. Separation of the phases yields these respective products.

While phosphite esters are more readily hydrolyzed, they are also more readily formed than are phosphate esters. Accordingly, preliminary to the hydrolysis step, the process preferably comprises substantially complete conversion of P(III) species to phosphite esters, either in the course of the oxidation reaction or in a subsequent esterification step. In the oxidation and/or esterification, the P(V) species may also be entirely converted to phosphate esters, but not necessarily so. Upon essentially quantitative esterification of P(III) species, unesterified P(V) oxyacid may be removed prior to the hydrolysis step by phase separation and extraction of phosphoric acid from the organic (phosphite ester) phase with water.

If subject to esterification at all, P(I) oxyacid is also much less readily esterified than P(III) acid. Thus, hypophosphorous acid may be removed after oxidation/esterification in an aqueous phase that also contains any unesterified P(V) acid, or it may be dealt with in other convenient ways. In certain preferred schemes as described hereinbelow, P(I) is converted to P(III) acid and recovered in that form, with or without an intervening esterification step.

The various processes of this invention offer significant advantages over known processes for synthesis of phosphorus compounds from white phosphorus in providing an economical route to phosphorus oxyacids, organophosphates and organophosphites with high selectivity and yield. The process according to the invention is also environmentally safe.

OXIDATION

Oxidation of phosphorus is preferably carried out by contacting white phosphorus, alcohol, and oxygen to produce various phosphorus species including oxyacids of phosphorus, organophosphates and/or organophosphites. In a preferred embodiment, the reaction system for such an oxidation reaction contains no catalyst, and in a further preferred embodiment, the reaction system contains no additional solvent (beyond the alcohol reactant which also enhances solubility and provides a reaction medium). A variety of reaction mechanisms can occur in such a reaction system to produce a mixture of products including phosphorous ($H_3PO_3$) and phosphoric acid ($H_3PO_4$), hypophosphorous acid ($H_3PO_2$), mono, di- and tri-alkylphosphites and phosphates.

The oxidation reaction may generally proceed by charging a reaction vessel with an alcohol and white phosphorus. If the reaction is to take place at a temperature above the melting point of white phosphorus, the reaction mixture is generally heated to the melting point of white phosphorus (approximately 44° C.) prior to the addition of oxygen, after which further external heating is unnecessary due to the exothermic nature of the oxidation reaction. If the reaction is to take place at a temperature below the melting point of white phosphorus, a highly dispersive form of white phosphorus solid, also referred to as white phosphorus "sand," may be generated before the introduction of oxygen. The oxidation reaction is then started by supplying the reaction mixture with oxygen, after which the rate of oxygen addition may be used to control the reaction rate and temperature. The oxidation reaction is generally complete when essentially all of the white phosphorus is consumed, which is indicated by a temperature decrease and the disappearance of white phosphorus.

The white phosphorus reactant is generally available in the form of solid pieces or particles. Elemental phosphorus in this form may be prepared for addition to the reaction mixture by cutting the white phosphorus into smaller pieces. However, in a commercial manufacturing process, elemental phosphorus is preferably supplied as molten tetraphosphorus. The phosphorus may be added to the reaction mixture all at once or over a period of time. Since white phosphorus melts at approximately 44.1° C., it is preferably pumped into the reaction mixture or into the charge mixture at a temperature of at least about 45° C. to about 47° C. Alternatively, the white phosphorus may be in a highly dispersive solid form referred to as white phosphorus "sand," which may be prepared by heating solid phase white phosphorus in the alcohol and/or a cosolvent to a temperature above the melting point of white phosphorus in the absence of oxygen, after which the molten white phosphorus-containing mixture is vigorously stirred as it is cooled below the melting point of white phosphorus.

The white phosphorus may be present in the reaction mixture as a solution (homogeneous system) or suspension (heterogeneous system). For example, the white phosphorus may be suspended or dissolved in a cosolvent, after which that suspension or solution is combined with the alcohol. Alternatively, the white phosphorus may be added to a mixture of a cosolvent and the alcohol to form a solution or suspension. In another preferred embodiment, the white phosphorus reactant is combined with the cosolvent as a suspension, thereby requiring a relatively low level of cosolvent compared to that required for forming a solution.

In a heterogeneous reaction system, cosolvent is not required for the oxidation reaction as such, though certain cosolvents such as benzene or toluene may serve usefully as azeotroping agents which promote removal of water and esterification of oxyacid reaction products. The presence of a cosolvent, preferably a non-polar solvent, may be important in a homogeneous system to enhance solubility of the reactants, provide a medium for the reaction, and afford satisfactory reactor payloads. Suitable cosolvents may be selected from arenes, including benzene, toluene and xylene; alkanes, including pentane, hexane, isooctane and dodecane; carbon tetrachloride; carbon disulfide; chloroform or mixtures thereof. More preferably, the cosolvent is toluene. The molar ratio of cosolvent to phosphorus atoms added to the reaction mixture is preferably in the range of about 1 to about 50, more preferably in the range of about 1 to about 20 and most preferably in the range of about 1 to about 5. The reaction system may optionally contain a water component, e.g., in the alcohol, which may affect the composition of the product mixture.

The alcohol reagent is generally any alcohol or mixture of alcohols suitable for participating in the inventive process. In a preferred embodiment, the alcohol is an alkanol represented by the formula R—OH, wherein R is an alkyl group having from 1 to 30 carbon atoms, more preferably 1 to 18 carbon atoms and most preferably 1 to 10 carbon atoms. For example, the alcohol may be methanol, ethanol, propanol, butanol, isobutanol, hexanol, octanol, 2-ethylhexanol, nonyl alcohol or mixtures thereof. Separations may be facilitated if the alkanol is of limited miscibility with water, but has sufficient volatility for removal by distillation under moderate temperature and pressure conditions. Accordingly, alkanols containing at least five carbon atoms are preferred. Hexanols are particularly preferred. The alcohol may be further selected from benzyl alcohol and glycols. The alcohol may be a primary, secondary or tertiary alcohol, although primary alcohols are preferred. The molar ratio of alcohol to phosphorus atoms added to the reaction mixture is preferably about 1 to about 7, and more preferably the ratio is within the range of about 2 to about 3. Excess alcohol in the reaction mixture may also be available as a solvent and medium for the reaction.

Oxygen may be added to the reaction mixture in the form of $O_2$ or air and is preferably delivered by flow or static pressure. Oxygen is generally delivered at a sufficient rate to initiate and maintain an ongoing reaction as can be determined by one of ordinary skill in the art. The rate of oxygen addition to the reaction system may vary depending upon, for example, the amount of reactants or the efficiency of heat removal from the reaction system. The pressure of the reaction system is preferably within the range from atmospheric pressure up to the pressure at which the reaction system can proceed safely, e.g., without entering explosion conditions for oxygen, and more preferably ranges from 1–100 psig, most preferably about 1 to about 3 atm.

The reaction time may vary widely, depending upon the type and amount of reactants and any cosolvent, the reaction conditions such as temperature and pressure and the desired product. The reaction is generally considered complete when the white phosphorus is substantially all consumed. The overall reaction time for a batch reactor is preferably under 8 hours, and more preferably in the range of 1.0 to 5.0 hours, and most preferably in the range of 1.0 to 3.5 hours.

The oxidation reaction can take place within a wide range of temperatures above and below the melting point of white phosphorus. The reaction temperature is preferably within a range where the reaction can proceed safely and without causing undesirable reactions, preferably in the range of 25–100° C., more preferably in the range of 30–80° C., and most preferably in the range of 30–40° C. For oxidation reactions taking place at a temperature below the melting point of white phosphorus, the white phosphorus is preferably prepared as white phosphorus sand.

In a preferred embodiment, the oxidation reaction is run under conditions that suppress the creation of white smoke, which can adversely affect the product distribution, particularly the selectivity of lower oxidation species by causing over oxidation due to a significant level of vapor phase reaction. The white smoke can potentially occur in both reactions run above the melting point of white phosphorus (i.e., the molten state) and below the melting point of white phosphorus (e.g., the highly dispersive solid state referred to as sand). Smoking conditions are generally avoided by using lower alcohols (methanol, ethanol and isopropanol) or by using higher alcohols (butanol, pentanol and hexanol) in a wet condition. In the event that smoking occurs, the mixture can be settled into a non-smoking condition by removing the oxygen supply and/or adding water to the charge mixture and/or by cooling the reaction mixture.

The process of the invention is particularly suited for the preparation and isolation of phosphorous acid. Thus, in a particularly preferred embodiment, the oxidation step is conducted under conditions which provide a high selectivity to P(III) acid and P(III) esters, or in any event under conditions which tend to minimize oxidation of phosphorus to the P(V) state. High selectivity to P(III) is generally achieved under relatively mild conditions which avoid formation of white smoke.

For effective control of the reaction in an industrial process for the preparation of phosphorous acid and/or phosphite esters, it is preferred that phosphorus be contacted with an alcohol to provide a homogeneous or heterogeneous condensed phase reaction system, and that an oxygen-containing gas be introduced into the condensed phase reaction system under conditions of oxygen partial pressure, temperature and agitation of the reaction system such that, in a batch reaction, the rate of oxygen uptake, i.e., the rate of consumption of oxygen by the reaction, is not greater than about 0.2 lbs. per hour per lb. of phosphorus initially contained in the condensed phase reaction system. Particularly preferred is a heterogeneous reaction system comprising two condensed phases, one comprising the alcohol and the other comprising phosphorus. The second phase may consist of solid or molten white phosphorus, or may comprise a solution of elemental phosphorus in a substantially water-immiscible cosolvent. More preferably, the oxidation reaction is conducted in such a system at a temperature of between about 15° and about 70° C. while the system is agitated at a rate sufficient to promote a moderate rate of mass transfer between the gas phase and the condensed phase system, and also between the condensed phases, but insufficient to effect substantial dispersion of either the phosphorus phase in the alcohol phase or the alcohol phase in the phosphorus phase during introduction of oxygen into the system. Most preferably, the conditions are controlled so that the oxygen uptake is between about 0.05 and about 0.2 lbs. per hour per lb. of phosphorus initially charged to the system. Where formation of white smoke is avoided and reaction proceeds at moderate temperature and pressure, an oxidation reaction mixture is produced in which the molar ratio of P(III) product species to P(V) product species is at least about 4 preferably at least about 8.

The oxidation reaction may also be conducted continuously. Illustrated in FIG. 1 is a continuous stirred tank reactor 1 defining a continuous reaction zone 3 into which an oxygen-containing gas, an alcohol, and elemental phosphorus are continuously or intermittently introduced, and from which a reaction mixture comprising esters of phosphorous acid and phosphoric acid are continuously or intermittently withdrawn. Moderate agitation is provided by a mechanical agitator 5 and oxygen or air is sparged into the reaction zone through a dip pipe 7. As in the case of a batch reactor, the reaction zone of the continuous stirred tank reactor preferably comprises a heterogeneous condensed phase reaction system containing an alcohol phase and a second phase comprising elemental phosphorus. Alternatively, the reaction can be conducted in a homogeneous system comprising a cosolvent for elemental phosphorus that is compatible and miscible with the alcohol. The reactor is preferably operated to prevent the formation of white smoke, and it is particularly preferred that, as in the case of a batch reactor, the temperature be controlled within the range of about 15° to about 70° C. In a heterogeneous system, agitation is preferably sufficient to promote mass transfer among the phases but insufficient to cause significant interdispersion of the phases.

The product of the step of contacting white phosphorus, alcohol, and oxygen is typically a mixture of oxyacids of phosphorus, organophosphates and organophosphites, representing a range of oxidation states. For example, a typical completed reaction mixture may contain about 75% of P(III) species, about 15% of P(V) species, about 4% of P(I) species and 6% of higher aggregates of P(V) and P(III) species. The state of oxidation of phosphorus indicates the number of bonds of a phosphorus atom in the molecule linked with more electronegative elements such as oxygen or halogen diminished by the number of bonds thereof linked with more electropositive elements, e.g., hydrogen, sodium or carbon. Thus, the state of oxidation of phosphorous acid ($H_3PO_3$) is three, and phosphorous acid and its esters are referred to as P(III) species. The products of the step of aerobic oxidation of white phosphorus may then be processed by the inventive separation procedure to economically obtain desired products in high yield and purity.

Separation Scheme

In the separation process according to the invention, a mixture of phosphorus-containing compounds, which may include oxyacids of phosphorus, organophosphates, and organophosphites, is separated by a procedure that utilizes the rate difference in hydrolysis of organophosphorus species of different oxidation states as well as the efficient partitioning of phosphorus species of different polarities in a biphasic system.

In a preferred embodiment, the inventive separation process is applied to the product mixture from the oxidation reaction of white phosphorus, alcohol and oxygen as described above. The components of that oxidation product mixture may be isolated in the form that they exist in the oxidation mixture or certain components of the oxidation mixture may be converted into other compounds in the course of the isolation procedure. For example, a P(I) oxidation product can be either converted to P(III) in situ to increase the overall yield of P(III) or it can be isolated in high purity as a by-product of the process.

Separation of P(III) and P(V) species is facilitated and overall process yields enhanced by obtaining maximum conversion of at least one of the P(III) and P(V) oxyacids to the ester state before hydrolysis. Any unesterified oxyacid of the other oxidation state may then be removed prior to the hydrolysis and further separation obtained by differential hydrolysis. Under most conditions, substantially complete esterification is achieved more readily in the case of phosphorous acid, so esterification is preferably conducted until unesterified phosphorous acid has been substantially converted, with or without complete esterification of phosphoric. Due to the presence of water in the oxidation reaction system, complete esterification is ordinarily not achieved in the oxidation reaction as such, even in the presence of a substantial excess of alcohol. Optionally and preferably, therefore, water is removed from the oxidation reaction mixture under esterification conditions for complete conversion of P(III) species to phosphite esters, producing an esterification reaction mixture in which the molar ratio of phosphite esters to phosphorous acid is at least about 4, more preferably at least about 8.

Esterification

Esterification is preferably carried out at a temperature of between about 1000 and about 200° C., more preferably between about 130° and about 160° C., with removal of water by evaporation or distillation from the mixture during the course of esterification. Most preferably, water is removed by azeotropic distillation. A suitable azeotrope may consist of the alcohol and water. Optionally, a substantially water-immiscible azeotroping agent such as benzene, toluene, etc. may be included in the oxidation or esterification charge mixture. A non-condensable gas may be bled through the reacting mixture to aid in stripping of water therefrom. Overhead vapor from the azeotropic distillation is condensed, producing a two phase condensate comprising an aqueous phase and an organic phase. The organic phase comprising the alcohol and/or other azeotroping agent may be refluxed to aid in the continuing removal of water from the reaction mixture, and for at least partial recovery of alcohol. Use of a relatively high molecular weight alcohol in the esterification (and in the oxidation) promotes partition of alcohol to the organic phase of the condensate and retention in the esterification reaction mixture.

The esterification reaction mixture typically comprises an organic phase of limited miscibility with water. As noted above, esterification of phosphorous acid can be carried to completion more rapidly than esterification of phosphoric acid, so that the esterification reaction mixture may contain a significant component of unesterified phosphoric acid. As further noted, any hypophosphorous acid contained in the oxidation reaction mixture also remains largely unesterified.

If dialkyl phosphite esters are a desired product of the reaction, they may be recovered in high yield by reduced pressure distillation from the esterification reaction mixture. Monoalkyl phosphites are primarily retained in the distillation residue. Separation of P(III) oxyacid from the residue may then proceed according to the hydrolytic separation process of the invention.

Extraction

Prior to hydrolysis, water-soluble components of the esterification reaction mixture are preferably separated from the organic phase. More preferably, the organic phase is contacted with water for extraction of residual aqueous soluble components therefrom. Thus, unesterified aqueous components, prominently hypophosphorous acid and unesterified phosphoric acid are separated in the extract, yielding an extracted organic phase (organic raffinate) in which the molar ratio of P(III) species (essentially phosphite esters) to the sum of P(V) (phosphate esters and residual phosphoric acid) and P(I) species (residual hypophosphorous acid and hypophosphite esters to the extent they may exist) is at least about 1.5, preferably at least about 2. To the extent that any hypophosphite esters may be contained in the esterification reaction mixture, they are apparently hydrolyzed in the extraction.

Where phosphoric acid is quantitatively esterified, extraction may be omitted and hypophosphorous acid contained in the esterification mixture may later be converted to phosphorous, e.g., by catalytic oxidation with water as described hereinbelow.

Hydrolysis

With or without the intermediate extraction step, a hydrolysis feed mixture comprising alkyl esters of phosphoric and phosphorous acid is subjected to differential hydrolysis to produce a two phase hydrolysis reaction mixture having an aqueous phase comprising phosphorous acid and a substantially water-immiscible organic phase comprising alkyl phosphate esters. Typically, the feed mixture to the hydrolysis step comprises between about 20 and about 40 mole percent phosphate esters and between about 60 and about 80 mole percent phosphite esters. Hydrolysis is conducted in the presence of liquid water or steam, most preferably by steam distillation, and is preferably catalyzed by the presence of an acid such as, e.g., phosphorous acid or HCl, in the hydrolysis feed mixture. Alcohol released in the hydrolysis is removed from the hydrolysis reaction mixture in the overhead vapor from the steam distillation. Where the alcohol is a higher alkanol substantially immiscible with water, or of limited miscibility with water, it may be recovered as a separate phase from the overhead condensate. Alternatively, the steam distillation may be conducted in the presence of a volatile organic solvent, so that the alcohol is substantially partitioned to the organic phase of a two phase condensate, thereby facilitating recovery of alcohol. Advantageously, the organic solvent comprises an azeotroping agent which further serves to facilitate removal of water and/or alcohol in the steam distillation. The separated alcohol phase, and in certain embodiments a solution of alcohol in an azeotroping solvent, may be recycled to the oxidation and/or esterification reaction zone to provide a supply of alcohol for these steps of the process.

Essentially quantitative conversions of phosphite esters to phosphorous acid are readily achieved in the hydrolysis. To maximize productivity and yield, the conversion should be as high as feasible, preferably at least about 80%, more preferably at least about 95%, most preferably at least about 98%. In accordance with the invention, it has been discovered that, even at high conversions, the hydrolysis is highly selective for the formation of phosphorous acid from phosphite esters, without significant formation of phosphoric acid from phosphate esters. For example, at a conversion of at least 80%, a hydrolysis feed mixture containing 0.1 to 0.5 moles phosphate esters per mole phosphite esters yields a hydrolysis reaction product having an organic phase which contains at least 8 moles phosphate esters per mole of phosphite esters, or more, the hydrolysis reaction mixture contains at least about 8 moles phosphorous acid per mole phosphoric acid, with a phosphorous to phosphoric molar ratio of at least about 80 being readily achievable, especially in the preferred process of the invention wherein the esterification reaction mixture is subjected to water extraction for removal of unesterified phosphoric acid prior to hydrolysis. Hydrolysis may be carried out continuously under terminal conditions which yield an aqueous phase containing not more than about 80% by weight water and at least about 15% by weight phosphorous acid, the phosphorous acid serving as a catalyst for the hydrolysis reaction. After the organic phase has been extracted with water and the aqueous phases combined, the phosphorous acid product comprising the combined aqueous phases has a phosphorous acid content of at least about 20% by weight, typically between about 20 and about 60% by weight. Residual phosphoric acid content is between about 0.25% by weight and about 0.5% by weight. The molar ratio of phosphorous to phosphoric acid in the phosphorous acid product is at least about 50, typically between about 90 and about 100.

The substantially water-immiscible organic phase of the hydrolysis reaction mixture contains phosphate esters to the extent of between about 5% to about 40%, more typically 10 and about 30 mole % based on original phosphorus g-atom charged to the oxidation reaction.

Although oxidation in the presence of an alcohol followed by a separate esterification reaction is preferred, other alternatives may be used to produce the mixture of esters comprising the hydrolysis feed mixture. For example, the oxidation may be conducted in the presence of an alcohol under conditions such that P(III) reaction products are substantially completely in ester form. While this embodiment of the reaction is not limited to any particular theory as to the mechanism thereof, the net effect of such conditions is to drive the esterification substantially to completion during the oxidation. Although the reaction is described herein as oxidation followed by esterification, it is not intended that the invention be limited to any particular mechanism by which the overall reaction is accomplished. Thus, the description of oxidation/esterification sequence is intended to embrace any mechanism by which esters of the oxyacids are formed.

To obtain an oxidation reaction mixture comprising a high ratio of phosphite esters to phosphorous acid, a substrate comprising phosphorus, a P(I) species, or mixtures thereof may be oxidized in the presence of an alcohol in a condensed phase reaction medium containing not more than about 5% by weight water. Such water concentration is maintained by continual or intermittent removal of water from the oxidation reaction system by evaporation or distillation, preferably under azeotropic distillation conditions comparable to those discussed above for the esterification reaction. In fact, the formation of P(III) ester species may be driven substantially to completion by continual or intermittent removal of water even if the water content of the reaction mixture is not maintained at the aforesaid level throughout the course of the oxidation reaction, provided that the water content at the end of the oxidation is sufficient for substantially complete conversion to P(III) esters. In accordance with such embodiments, an oxidation reaction mixture is produced comprising P(III) and P(V) oxidation products comprising alkyl esters of phosphorous acid, alkyl esters of phosphoric acid and mixtures thereof, with a molar ratio of P(III) esters to P(V) oxyacid of at least about 8. Optionally, this reaction mixture may be directly subjected to hydrolysis for preparation of a phosphorous acid reaction product substantially devoid of phosphoric acid and a phosphate ester product substantially free of phosphite esters. The oxidation reaction product mixture may be extracted with water for removal of residual phosphoric and hypophosphorous acid, for example, in the manner described above for extraction of an esterification reaction mixture, and the organic raffinate of the extraction used as the feed mixture for the hydrolysis.

Certain embodiments of the process of the invention are particularly advantageous in the preparation of phosphorous acid and/or organophosphate esters. In the first of these embodiments, the inventive separation process involves (i) azeotropic distillation to place all P(III) species in ester form, (ii) aqueous extraction to remove water-soluble species, such as $H_3PO_4$ and the P(I) species, and (iii) hydrolysis to convert phosphites to acid. This embodiment takes advantage of efficient partitioning of species of different polarities in a biphasic system as well as the rate difference in hydrolysis of organophosphorus species of different oxidation states. The mixture of species is first subjected to azeotropic distillation, preferably with addition of a solvent such as benzene or toluene depending on the desired boiling point. The azeotropic distillation will break up the aggregates of various species and convert residual acid into its ester forms so that all of the P(III) species will become less soluble in water. The azeotropic distillation is generally stopped after phosphorous acid ($H_3PO_3$) is converted to its ester forms, i.e., $HP(=O)(OR)_2$ and $HP(=O)(OR)(OH)$.

Subsequent extraction of the resulting mixture with water then removes water-soluble phosphorus species, such as phosphoric acid ($H_3PO_4$) and the P(I) species. This takes advantage of both slow esterification of phosphoric acid under the azeotropic conditions and fast hydrolysis of $H_2P(=O)(OR)$ under the extraction conditions. The organic layer containing P(III) and P(V) esters is then hydrolyzed with water under reflux conditions. Because of the significant differences in hydrolysis rates between the phosphite and phosphate esters, conditions have been identified where phosphite esters are nearly quantitatively hydrolyzed to phosphorous acid ($H_3PO_3$) while phosphate esters remain intact in the organic phase. The aqueous layer is then separated from the hydrolysis mixture and the combined aqueous portions contain up to 99% of phosphorus content in the form of $H_3PO_3$ by $^{31}P$ NMR spectroscopy. The organic layer contains mostly phosphate esters with a small residual amount of unhydrolyzed $HP(=O)(OR)(OH)$.

As indicated, the oxidation reaction mixture may contain a minor but economically significant fraction of hypophosphorous acid. While this fraction is readily recovered by extraction after esterification of the P(III) oxyacid, it may be preferable to oxidize the P(I) oxyacid for ultimate recovery in the form of the P(III) oxyacid. For example, the oxidation reaction mixture may be contacted with oxygen or air to convert P(I) acid to P(III) before esterification, or P(I) acid may be oxidized to P(III) acid in the aqueous phase of the hydrolyzate, or in an aqueous fraction obtained by water extraction of the organic phase of the esterification reaction mixture.

If P(I) acid is to be separated and recovered by extraction, both P(III) and P(V) acids should be substantially esterified before separation and extraction of the P(I) acid. Complete esterification of P(V) acid is also desirable in any scheme for the conversion of P(I) acid to P(III) acid downstream of the esterification step. In a further alternative embodiment of the invention, P(I) is converted to P(III) acid before esterification, so that all P(I) components of the oxidation reaction mixture are ultimately recovered as $H_3PO_3$, irrespective of the extent of esterification of P(V) acid. In this embodiment, the inventive separation process involves (i) contacting the phosphorus species mixture with oxygen to convert P(I) to P(III), (ii) azeotropic distillation to convert acid species to an ester form, (iii) steam distillation to hydrolyze P(III) esters to $H_3PO_3$, and (iv) aqueous extraction to remove $H_3PO_3$. To avoid the step of separating P(I) from the mixture, air or oxygen is first bubbled through the mixture to convert P(I) to P(III). The resulting mixture then undergoes azeotropic esterification until the free phosphoric acid is no longer detected.

The resulting esterification mixture is then subjected to steam distillation, wherein only the hydrolysis of P(III) esters is effected and the composition of the phosphate esters remains unchanged. Upon completion of hydrolysis of the P(III) esters to $H_3PO_3$, the aqueous layer is combined with one aqueous wash of the organic layer to give an aqueous solution of $H_3PO_3$. The organic layer contains mainly phosphate esters. By converting P(I) to P(III), the procedure not only eliminates the need for separating P(I) species from the reaction mixture but may also increase the yield of P(III). Using steam distillation in the hydrolysis stage combines two tasks into a single step, i.e., alcohol recovery and hydrolysis. Removing alcohol from the ester mixture also improves the efficiency of the hydrolysis.

Preferably, hypophosphorous acid is oxidized to phosphorous acid by catalytic oxidation reaction with water. Metal catalyst, e.g., nickel and copper, may be used. For example, using a palladium catalyst such as Pd black or Pd/C, preferably at a catalyst loading of between about 0.1 and about 5 mole % based on g-atoms phosphorus charged and a temperature of between about 40° C. and about 150° C., preferably between about 55° C. and about 95° C., hypophosphorous acid is essentially quantitatively hydrolyzed to phosphorous acid without significant formation of phosphoric acid.

Figure 2:
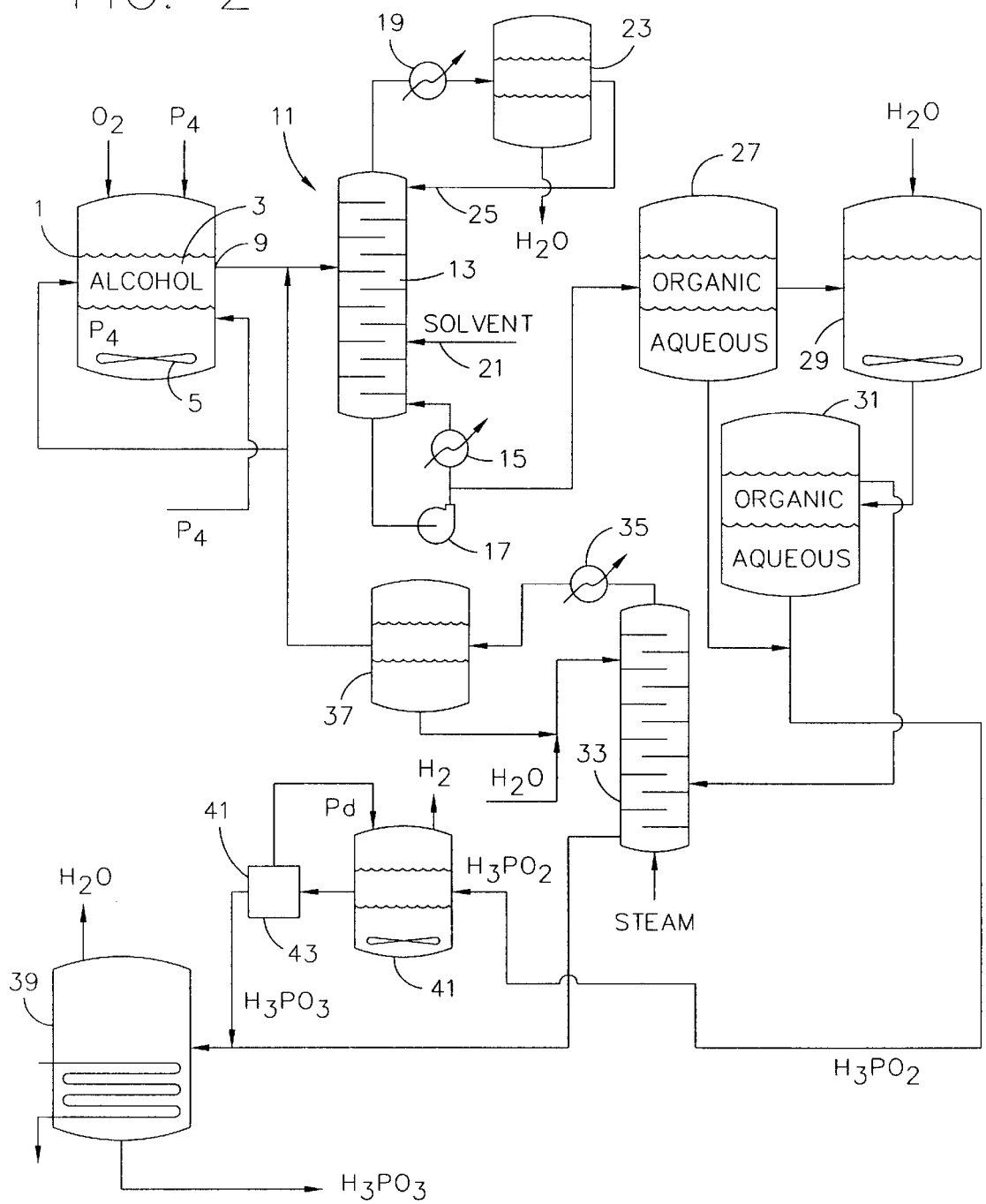
FIG. 2 is a process flowsheet illustrating a preferred embodiment of the process of the invention.

A preferred embodiment of the invention is illustrated in the process flowsheet of FIG. 2. The process of this flowsheet may be operated in a continuous mode at each process step. As shown in the drawing, alcohol, molten tetraphosphorus and oxygen are continuously introduced into the reaction zone 3 of continuous stirred tank reactor 1. Moderate agitation is provided by mechanical agitator 5. Agitation is sufficient for transfer of oxygen to the phosphorus phase and transfer of the products of the oxidation reaction to the alcohol phase. The oxidation reactor product mixture exits reactor 1 via discharge port 9, and is optionally mixed with recycle alcohol to provide the feed mixture to esterification reactor 11. The esterification reactor comprises a distillation column 13, provided with a reboiler 15, a reboiler circulation pump 17, and an overheads condenser 19. Water is removed by distillation, thereby promoting conversion of phosphorus oxyacids in the feed stream to organophosphate and organophosphite esters. Removal of water is promoted by use of an azeotroping solvent. Solvent is substantially retained within the distillation system, but makeup solvent may be fed through solvent feed port 21. Preferably, the azeotroping solvent is immiscible with water so that condensation of the overhead vapor forms a two phase condensate comprising an aqueous phase and a solvent phase. The condensate is directed to a condensate separator 23 from which the solvent phase is decanted and returned as reflux to the column at reflux port 25. Water drained from the bottom of separator 23 may be discarded or used elsewhere in the process as process water. Column bottoms are circulated through reboiler 15 by reboiler pump 17, and a fraction of the recirculation stream, comprising the esterification reaction mixture, is drawn off and transferred to a column bottoms separator 27.

The residence time and water content in the bottom of the column are controlled to achieve substantially quantitative esterification of both phosphorous and phosphoric acids. The organic phase of the esterification reaction mixture is decanted from the aqueous phase in separator 27 and washed for removal of unesterified phosphorus oxyacids, primarily hypophosphorous acid. As illustrated in FIG. 2, washing is accomplished by contacting the organic phase with water in a mixer 29 and separating the wash liquor in a settler 31. In an alternative embodiment, the washing step may be carried out using other liquid/liquid contacting apparatus, e.g., a countercurrent multistage extraction column having the organic phase from separator 27 fed to the top, wash water fed to the bottom, wash liquor removed from the top and washed organic phase removed from the bottom. The wash liquor is combined with the aqueous phase from separator 27 and may be removed from the process as a separate hypophosphorous acid stream. Alternatively, hypophosphorous acid contained in the combined stream may be converted to phosphorous acid as described hereinbelow.

The washed organic ester phase comprises a hydrolysis feed mixture that is introduced into a steam distillation column 33. Steam is introduced into the lower portion of the column and flows upwardly effecting selective hydrolysis of the phosphite esters in the hydrolysis feed mixture and removing alcohol by-product of the hydrolysis by distillation. The hydrolysis is preferably conducted in the presence of an acid catalyst, e.g., HCl or phosphorous acid. Phosphorous acid may be supplied by recycle of small fraction of either the hydrolysis reaction product stream or the final phosphorous acid product stream.

Overhead vapor from column 33 is condensed in condenser 35 and may be refluxed to the column to augment the supply of water for the hydrolysis. In a preferred embodiment of the invention wherein the alcohol is of limited miscibility with water (and is more preferably substantially immiscible with water), a two phase condensate forms in condenser 35. The condensate flows to a condensate separator 37 from which the alcohol is removed. The aqueous condensate may be refluxed as desired to augment the supply of water for hydrolysis in the column.

As shown in FIG. 2, the alcohol phase is recycled to the oxidation reactor 1 or to the esterification reaction column 11 to provide a source of alcohol for the esterification.

Hydrolysis reaction product comprising phosphorous acid is withdrawn from the bottom of column 33. Typically, the phosphorous acid content of the aqueous hydrolyzate is at least about 20% by weight, preferably between about 20% and about 70% by weight. Optionally, this stream may be concentrated in an evaporator 39 to a phosphorous acid content of at least 50% by weight, preferably between about 60% and about 85% by weight. If desired, the product can be further concentrated to produce flaked phosphorous acid.

Phosphorous acid yields may be augmented by oxidation of hypophosphorous acid contained in the aqueous phase from settler 27 and the wash liquor from settler 31. As illustrated in FIG. 2, the streams are combined to provide the feed mixture to a catalytic water oxidation reactor 41. As indicated in the drawing, Pd is a preferred oxidation catalyst. However, as described above, the catalyst may comprise other metals, particularly Cu or Ni. The phosphorous acid product exiting reactor 41 has a high ratio of P(III) oxyacid to the sum of P(I) and P(V) oxyacids. The aqueous product stream from reactor 41 is passed through a filter 43 for recovery of catalyst which is recycled to reactor 41. The filtrate exiting filter 43 may be combined with the aqueous hydrolyzate from column 33 to provide the feed stream to evaporator 39.

Where the unesterified P(V) acid content of the oxidation or esterification reaction mixture is low enough, it may be feasible to eliminate the step of washing the organic phase obtained from settler 27. In this embodiment, the organic phase of the esterification reaction mixture is transferred directly to the hydrolysis step, as conducted, e.g., in steam distillation column 33. The aqueous stream exiting the bottom of column 33 may be directed to catalytic oxidation reactor 41 for conversion of residual hypophosporous acid to phosphorous acid. Preferably, the aqueous fraction from settler 27 is incorporated into the feed stream to reactor 41.

Figure 3:
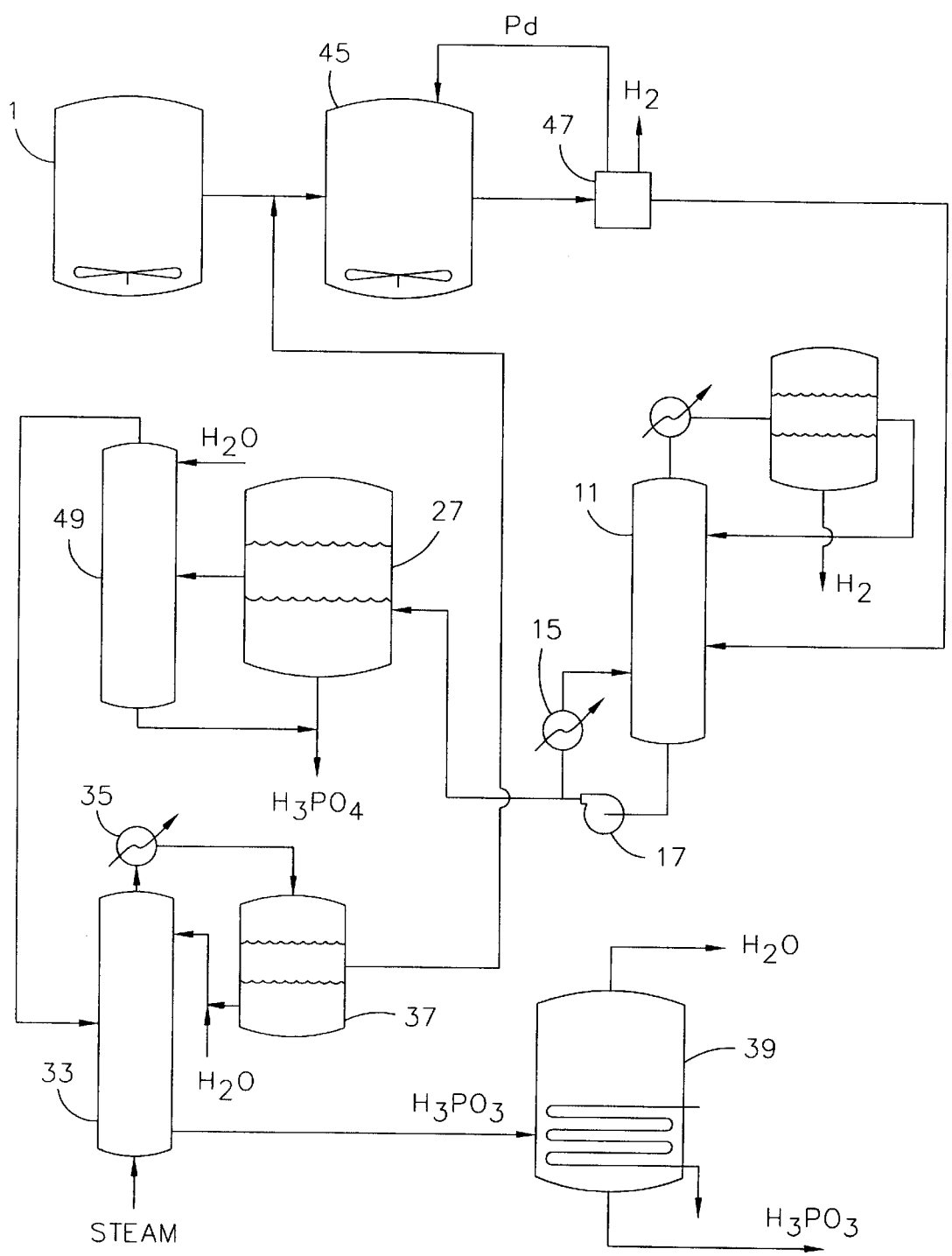
FIG. 3 is a flowsheet illustrating an alternative embodiment in which P(I) acid contained in the oxidation reaction is converted to P(III) acid by catalytic oxidation with water.

FIG. 3 illustrates an alternative process flow sheet in which P(I) acid contained in the oxidation reaction mixture is converted to P(III) acid by catalytic oxidation with water in a reactor 45 positioned between oxidation reactor 1 and esterification reaction column 11. Catalyst is removed in filter 47 for recycle to reactor 45. Filtrate exiting filter 47 is directed to the esterification reaction column 11. Preferably, esterification column 11 is operated under conditions effective to esterify all P(III) oxyacid, but not necessarily to esterify all phosphoric acid. As in the process of FIG. 2, an aqueous phase is separated from the esterification reaction mixture in settler 27. Residual phosphorus oxyacid is extracted from the organic phase in a countercurrent extraction column 49. The combined aqueous phase from settler 27 and wash liquor from column 49 constitute a phosphoric acid fraction which is removed from the process. The organic raffinate obtained from the top of column 49 constitutes a hydrolysis feed mixture for steam distillation column 33 which operates in the manner described in FIG. 2 to provide a phosphorous acid product stream that may be concentrated as described in evaporator 39. Alcohol recovered in the organic phase from condensate settler 37 may be recycled to the oxidation or esterification step of the process.

While differential hydrolysis of organophosphorus esters is the preferred method of the invention for separation of P(III) from P(V) species, phosphorous acid may also be produced by a process in which the separation is obtained by distillation. As in the differential hydrolysis process, an elemental phosphorus or P(I) substrate is oxidized in the presence of alcohol. Preferably, P(V) and P(III) oxyacids formed in the oxidation are substantially quantitatively esterified, either in the oxidation reaction or in a further esterification reaction step, to yield an ester mixture predominantly comprising dialkyl phosphite esters and either di- or trialkyl phosphate esters. After separation of any residual aqueous phase from the ester mixture, the organic phase may be washed for removal of phosphoric and hypophosphorous acids.

A distillation feed mixture is prepared comprising phosphate esters and phosphite esters produced by the aforesaid oxidation and/or esterification reaction(s) and contained in the organic phase of the reaction mixture. The distillation feed mixture is distilled, preferably under vacuum, to yield a dialkyl phosphite distillate fraction therefrom.

A hydrolysis feed mixture is prepared comprising dialkyl phosphite ester(s) obtained in the aforesaid distillate fraction. The hydrolysis feed mixture is then contacted with steam or liquid water for hydrolysis of dialkyl phosphite ester(s) to phosphorous acid.

Hydrolysis of the dialkyl phosphite ester(s) may be conducted under steam distillation conditions effective for removal of alcohol from the hydrolysis reaction zone. Preferably, the alcohol used in the oxidation and/or esterification reaction(s) is substantially immiscible with water so that the overhead vapor from the steam distillation may be condensed to form a two phase condensate, which is separated by decantation. The aqueous condensate phase may be refluxed to provide a source of water for the hydrolysis; and the alcohol phase may be recycled to the oxidation and/or esterification reaction steps.

The phosphorous acid product of the process of this invention may advantageously be used in the preparation of substituted or unsubstituted N-phosphonomethylamines, especially substituted or unsubstituted N-phosphonomethylglycine. In the preparation of substituted or unsubstituted N-phosphonomethylglycine, phosphorous acid produced in the process of the invention is reacted with formaldehyde and a substituted or unsubstituted glycine, e.g., iminodiacetic acid ("IDA"), mono-alkali metal salt of IDA or alkali metal salt of IDA in a manner well known to the art as described, for example, in U.S. Pat. Nos. 3,288,846, 4,724,103, and 4,775,498. In fact, the aqueous phase of the hydrolysis reaction product may be directly employed without further purification in the preparation of N-phosphonomethylamines such as N-hydroxycarbonyl-methyl-N-phosphonomethylglycine by reaction with formaldehyde and iminodiacetic acid. A preferred method for preparation of N-phosphonomethylglycine as described in copending Ser. No. 09/022,967

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This example illustrates a process of isolating high purity phosphorous acid ($H_3PO_3$) (aq.) and phosphate esters from a reaction mixture produced by aerobic oxidation of white phosphorus ($P_4$) in hexanol.

A 250 mL Fisher-Porter vessel containing 20.0 g of $P_4$ (0.646 mol) and 160 g anhydrous hexanol was mounted onto a reactor assembly. The system was purged with $N_2$ and then heated to 45° C. with a heat gun while stirring. Upon melting of $P_4$, heating was stopped and a highly dispersive $P_4$ sand was formed as the mixture was cooled to room temperature with stirring. Smoke was observed when oxygen was briefly admitted as the white phosphorus and alcohol suspension cooled to room temperature. Oxygen was reintroduced without white smoking after the mixture was allowed to stir for two hours at room temperature. The oxygen delivery pressure was set at 2.5 psi and the temperature control was set for 35° C. For efficient heat transfer, the Fisher-Porter reaction vessel was cooled via a water bath.

After 12 h, a clear solution resulted and oxidation was complete based on the $^{31}P$ NMR spectrum. the resulting solution was mixed with 93.0 g hexanol and divided into two parts which were 46.6 and 53.4 wt%, respectively. One portion (46.6 wt %) was distilled for removal of water under alcohol reflux at 160° C. with a Dean-Stark distillation set-up. During the first h of reflux, air was bubbled through the mixture and it was followed by nitrogen bubbling for an additional 5 h of reflux. The resulting mixture was mixed with 300 mL water and subjected to steam distillation-hydrolysis at 105° C. After 7 hours, 110 mL hexanol was recovered and the residual two-phase mixture in the distillation flask was separated. The organic layer was washed with 50 mL water.

The combined aqueous layer yielded 80.3% phosphorous acid with 98.3% phosphorus purity by $^{31}$P NMR spectrum based calibration with a known amount of authentic phenylphosphonic acid. The organic layer contained 19.2% of total phosphorus added based on calibration with a known amount of authentic diethylphosphite, mostly in the form of dihexylphosphate (70%) and monohexylphosphate (20%). The second part of the oxidation mixture (53.4 wt %) was worked up similarly and gave a phosphorous acid yield of 80.0% with a purity 99.2% based on phosphorus.

EXAMPLE 2

This example illustrates the process described in Example 1 with an alcohol reactant of pentanol.

An oxidation run was carried out as in Example 1 with 20.34 9 of $P_4$ and 140 g of pentanol instead of hexanol. The workup was similar to that of Example 1 except that the azeotropic reflux was at 150° C. instead of 160° C. as in Example 1. The yield of phosphorous acid was 78.2% and purity based on phosphorus was 96.6%. Distillation residue weighed 42.3 g.

EXAMPLE 3

This example illustrates the process described in Example 1 with an alcohol reactant of butanol. An oxidation run was carried out as in Example 1 with a one time $P_4$ charge of 10.44 g and 107 g of butanol instead of hexanol. The workup was similar to that of Example 1 except that the azeotropic reflux was conducted at 130° C. instead of 160° C. The purity of the isolated phosphorous acid was 96.8% and yield was 80.1%.

EXAMPLE 4

This example illustrates a process of isolating high purity phosphorous acid ($H_3PO_3$) (aq.), hypophosphorous acid $H_3PO_2$ (aq.) and phosphate esters from a reaction mixture of aerobic oxidation of white phosphorus in an alcoholic solvent.

A 120 mL Fisher-Porter vessel containing 10.51 g of $P_4$ and 80.0 g of water saturated hexanol (6.3% wt) was mounted onto the reactor assembly. The system was purged with $N_2$ and then heated to 45° C. with a heat gun while stirring. Upon melting of $P_4$, heating was discontinued and the mixture was stirred vigorously to produce a highly dispersed suspension. When the temperature of the mixture dropped below 40° C., $P_4$ solidified forming a highly dispersive $P_4$ sand. At room temperature, oxygen was introduced at 4.5 psi and the temperature control was set at 35° C. As the reaction temperature reached 35° C., cooling via water bath was introduced to maintain the reaction temperature slightly below 35° C. A clear solution resulted after 4 hours and the mixture was allowed to cool to room temperature.

The resulting solution was mixed with an additional 80 g hexanol. The mixture was subjected to azeotropic reflux at 160° C. for 12 hours with the aid of a nitrogen stripper. After the azeotropic distillation mixture was cooled to room temperature, it was washed with 2×25 mL water. The isolated aqueous layer contained $H_3PO_2$ and 3.5% of total phosphorus. The organic layer was charged with 350 mL water and subjected to steam distillation-hydrolysis at 105° C. After 7 hours, 150g hexanol was recovered. The distillation residue was separated and the organic layer was washed with 25×2 mL water. The combined aqueous layer contained 73.4% total phosphorus and $H_3PO_3$ was higher than 99% of the phosphorus in solution. The organic layer was a mixture of dihexylphosphate (50%) and monohexylphosphate (50%), which weighed 21.76 g.

EXAMPLE 5

This example illustrates a process of isolating dialkylphosphite and phosphate esters from a reaction mixture produced by aerobic oxidation of white phosphorus in an alcoholic solvent.

An oxidation mixture obtained similarly to that of Example 1 from 5.08 g of $P_4$ and 81 g of wet hexanol (1.3%) was subjected to azeotropic reflux at 160° C. for 7.5 hours with an additional 80 g hexanol. During the first three hours of azeotropic distillation, air was used as the purge gas. The resulting mixture was then distilled initially under 0.5 mm Hg at 52° C. to remove hexanol 9110 g). Dihexylphosphite was subsequently distilled at 60–80° C. under 50 $\mu$m Hg and yielded 30.1 g (73.5%). The distillation residue weighed 9.76 g which contained mostly the P(V) esters.

EXAMPLE 6

This example illustrates a process of isolating an aqueous mixture of $H_3PO_3$, $H_3PO_2$ and $H_3PO_4$ from a reaction mixture produced by aerobic oxidation of white phosphorus in an alcoholic solvent.

A 120 mL Fisher-Porter vessel containing $P_4$ (5.44 g; 0.176 mol) and anhydrous ethanol (49.44 g) was mounted onto the above-mentioned reactor assembly. The system was purged with $N_2$ and then heated to 45° C. with an oil bath while stirring. Upon melting of $P_4$, heating was removed and the mixture was stirred vigorously to produce a highly dispersed suspension. As soon as the $P_4$ sand was formed (38° C.), oxygen was introduced at 1.5 psi and the temperature control was set at 52° C. maximum. The reaction was complete in 5 h. The resulting mixture was treated with 50 mL of water and subjected to fractional distillation using a 10 cm helices packed column. After 9 h, the distillation temperature reached 100° C., the aqueous distillation residue contained 75.4% $H_3PO_3$ 6.8% $H_2P(=O)(OH)$ and 17.8% P(V) species.

Table 1 summarizes the results of reactions run with this experimental procedure.

TABLE 1

Compositions of the Hydrolysis Mixtures from the Oxidation Reactions using Ethanol and Isopropanol as Solvents

| Alcohol | Temp (° C.) | % P (I)[b] | % P (III)[b] | % P (V)[b] |
|---|---|---|---|---|
| Pr[i] | 50 | 3.1 | 76.5 | 20.4 |
| Pr | 65 | 4.0 | 75.9 | 20.6 |
| Et | 52 | 6.8 | 75.4 | 17.8 |
| Et | 45 | 4.3 | 77.5 | 18.2 |

EXAMPLE 7

The following table illustrates the effect of water and reaction temperature on the percentage of hypophosphorous species in a reaction mixture of aerobic oxidation of white phosphorus in an alcoholic solvent.

Oxidation reaction was carried out similarly to that of Example 4 for the 35° C. experiments using hexanol of varying percentages of water (0 to 6.3%). The reaction time of the oxidation with a charge of 5 g $P_4$ and 80 g hexanol was about 2.5 h. For the 65° C. experiments, the oxidation was carried out similarly but with air cooling and the reaction time was about 2 h. The P(I) percentage was obtained by integrating both the $H_2P(=O)(OH)$ and $H_2P(=O)(Ohexyl)$ chemical shifts in the $^{31}P$ NMR spectra.

TABLE 2

P (I) % vs. Water in Hexanol and Oxidation Temperature

| $P_4$ (g) | $H_2O$ wt % | P (I) % | Temp (° C.) |
|---|---|---|---|
| 5.08 | 7.41 | 12.8 | 65 |
| 4.76 | 7.51 | 10.5 | 35 |
| 5.17 | 5.88 | 11.3 | 65 |
| 5.20 | 5.88 | 10.3 | 35 |
| 5.05 | 4.76 | 12.0 | 65 |
| 5.16 | 4.76 | 9.6 | 35 |
| 5.19 | 3.61 | 12.0 | 65 |
| 5.06 | 3.61 | 9.2 | 35 |
| 5.16 | 2.43 | 12.7 | 65 |
| 5.00 | 2.43 | 10.1 | 35 |
| 5.20 | 1.23 | 10.8 | 65 |
| 5.08 | 1.31 | 9.5 | 35 |
| 5.06 | 0.62 | 8.5 | 65 |
| 5.05 | 0.62 | 4.6 | 35 |
| 5.35 | 0.00 | 5.7 | 65 |
| 5.10 | 0.00 | 3.9 | 35 |

EXAMPLE 8

This example illustrates hydrolysis of phosphite esters under azeotropic distillation for removing by-product alcohol and driving the hydrolysis reaction to completion.

A hydrolysis feed mixture consisting of 98% bis-2-ethylhexyl phosphite (57.36 g; 183.5 mmol), bis-2-ethylhexyl alcohol (58.85 g; 451.9 mmol), water (111.32 g; 6.179 moles), and 37.8% HCl (1.89 g. 19.6 mmol) was placed in a 500 mL Morton flask equipped with a mechanical stirrer and a Dean-Stark trap fitted with a reflux condenser. The hydrolysis feed mixture was heated to a vigorous reflux. Condensation of overhead vapor produced a two phase condensate. Water collected in the Dean-Stark trap was separated from ethylhexyl alcohol and returned to the Morton flask throughout the hydrolysis. After 15 hours, all of the alcohol had been removed. The water phase remaining in the flask was analyzed by IC and a yield of 107% phosphorous was obtained.

EXAMPLE 9

A hydrolysis feed mixture consisting of 98% bis-2-ethylhexyl phosphite (46.74 g; 149.5 mmol), bis-2-ethylhexyl alcohol (49.92 g; 379.5 mmol), and a 9.44% by weight phosphorous acid solution (103.88 g) was introduced into a hydrolysis system of the type described in Example 8. The feed mixture was heated to a vigorous reflux. The water collected in the Dean-Stark trap was returned to the Morton flask throughout the hydrolysis. After nine hours all of the alcohol had been removed. The water phase remaining in the Morton flask was analyzed by IC and a yield of 101% phosphorous acid was obtained.

EXAMPLE 10

A hydrolysis feed mixture consisting of 98% bis-2-ethylhexyl phosphite (49.30 g; 155.7 mmol), bis-2-ethylhexyl alcohol (46.01 g; 349.8 mmol), and a 19.0% by weight phosphorous acid solution (124.58 g) was introduced into a hydrolysis system of the type described in Example 8. The water collected in the Dean-Stark trap was returned to the Morton flask throughout the hydrolysis. After seven hours all of the alcohol had been removed. The water phase remaining in the Morton flask was analyzed by IC and a yield of 102% phosphorous acid was obtained.

EXAMPLE 11

A hydrolysis feed mixture consisting of 98% bis-2-ethylhexyl phosphite (49.47 g; 158.2 mmol), bis-2-ethylhexyl alcohol (42.06 g; 322.9 mmol), and a 33.5% by weight phosphorous acid solution (122.79 g) was introduced into a hydrolysis system of the type described in Example 8. The water collected in the Dean-Stark trap was returned to the Morton flask throughout the hydrolysis. After five hours all of the alcohol had been removed. The water phase remaining in the Morton flask was analyzed by IC and a yield of 108% phosphorous acid was obtained. EXAMPLE 12

A hydrolysis feed mixture consisting of 98% bis-2-ethylhexyl phosphite (91.66 9; 293.1 mmol) and a 50% by weight phosphorous acid solution (125.03) was introduced into a 500 mL Morton flask equipped with a mechanical stirrer and a reflux condenser. The mixture was heated to a vigorous reflux. The organic phase was sampled and the depletion of bis and mono-2-ethylhexyl phosphite was monitored by $^{31}P$ NMR. The water phase was also sampled and the build up of phosphorous acid was monitored by $^{31}P$ NMR. After one hour and 50 minutes the system had reached equilibrium and conversion of bis-2-ethylhexyl phosphite was about 79%.

EXAMPLE 13

A hydrolysis feed mixture consisting of 98% bis-2-ethylhexyl phosphite (91.63 g; 293.0 mmol) and a 25% by weight phosphorous acid solution (110.10) was introduced into a 500 mL Morton flask equipped with a mechanical stirrer and a reflux condenser. The mixture was heated to a vigorous reflux. The organic phase was sampled and the depletion of bis and mono-2-ethylhexyl phosphite was monitored by 31P NMR. The water phase was also sampled and the build up of phosphorous acid was monitored by $^{31}P$ NMR. After six hours the system had reached equilibrium and conversion of bis-2-ethylhexyl phosphite was about 89%.

EXAMPLE 14

This example illustrates oxidation of hypophosphorous acid to phosphorous acid.

Reactions were conducted under an inert atmosphere. Water and hypophosphorous acid solutions were rigorously degassed with argon for at least thirty minutes prior to use. Hypophosphorous acid (50%) and palladium black used in the reactions were purchased from Aldrich and used without further purification.

In a 500 mL 3-necked round bottom flask equipped with a nitrogen purge, a stir bar, and reflux condenser, was charged 50% by weight hypophosphorous acid (123.97 g; 0.939 moles) and palladium black (1.70 g; 0.160 moles; 1.73 mole %). The flask was then placed in an oil bath at 75° C. for two hours at which time hydrogen evolution had subsided. The reaction mixture was then allowed to cool and was filtered. The reaction flask and the catalyst were washed with two small portions of deionized water (~15 mL). The water washes were added to the filtrate and analyzed.

The palladium black in the filter was returned to a round bottom flask that had already been charged with 50% by weight hypophosphorous acid (119.88 g; 0.908 moles). The flask was then placed in an oil bath at 75° C. for two hours at which time hydrogen evolution had subsided. The reaction mixture was then allowed to cool and was filtered. The reaction flask and the catalyst were washed with two small portions of deionized water (~15 mL). The water washes were added to the filtrate and analyzed. After the reactions were complete, the aqueous phase was analyzed by ion chromatography (IC) and $^{31}P$ NMR and found to almost quantitatively contain phosphorous acid. The results of these reactions are set forth in the table below.

|  | Selectively to $H_3PO_3$ | | |
| --- | --- | --- | --- |
|  | $^{31}P$ NMR | IC | Mass Balance |
| Cycle 1 | 99.2% | 99.9% | 97% |
| Cycle 2 | 99.5% | 99.9% | 101% |

While the compositions and methods of this invention have been described in terms of preferred embodiments, it will be apparent to those of skill in the art that variations may be applied to the process described herein without departing from the concept, spirit and scope of the invention. All such similar substitutes and modifications apparent to those skilled in the art are deemed to be within the spirit, scope and concept of the invention.

In view of the above, it will be seen that the several objects of the invention are achieved and other advantageous results attained.

What is claimed is:

1. A process for producing a substituted or unsubstituted N-phosphonomethylglycine, the process comprising:

contacting a hydrolysis feed mixture comprising esters of phosphorous and phosphoric acid with liquid water or steam at a temperature effective for selectively hydrolyzing phosphorous acid esters initially contained in the mixture, thereby producing a hydrolysis reaction mixture containing phosphorus oxyacids in a molar ratio of at least about 8 moles phosphorous acid per mole phosphoric acid; and, phosphorus oxyacids in a molar ratio of at least about 8 moles phosphorous acid per mole phosphoric acid; and, reacting the phosphorous acid produced by said hydrolysis with formaldehyde and substituted or unsubstituted glycine to produce a substituted or unsubstituted N-phosphonomethylglycine.

2. A process as set forth in claim 1 wherein phosphorous acid is separated from said hydrolysis reaction mixture in an aqueous phase that is substantially immiscible with an organic phase of said hydrolysis reaction product containing said alkyl phosphate esters, and said aqueous phase of said reaction product is contacted with formaldehyde and a substituted or unsubstituted glycine to produce said N-phosphonomethyl glycine.

\* \* \* \* \*

UNITED STATES PATENT AND TRADEMARK OFFICE
CERTIFICATE OF CORRECTION

PATENT NO. : 6,194,604 B1
DATED : February 27, 2001
INVENTOR(S) : Yinong Ma et al.

Page 1 of 1

It is certified that error appears in the above-identified patent and that said Letters Patent is hereby corrected as shown below:

<u>Column 9,</u>
Line 42, "1000" should read -- 100° --.

<u>Column 17,</u>
Line 27, "20.34 9" should read -- 20.34 g --.

Signed and Sealed this

Ninth Day of April, 2002

Attest:

*Attesting Officer*

JAMES E. ROGAN
*Director of the United States Patent and Trademark Office*